UNITED STATES PATENT OFFICE.

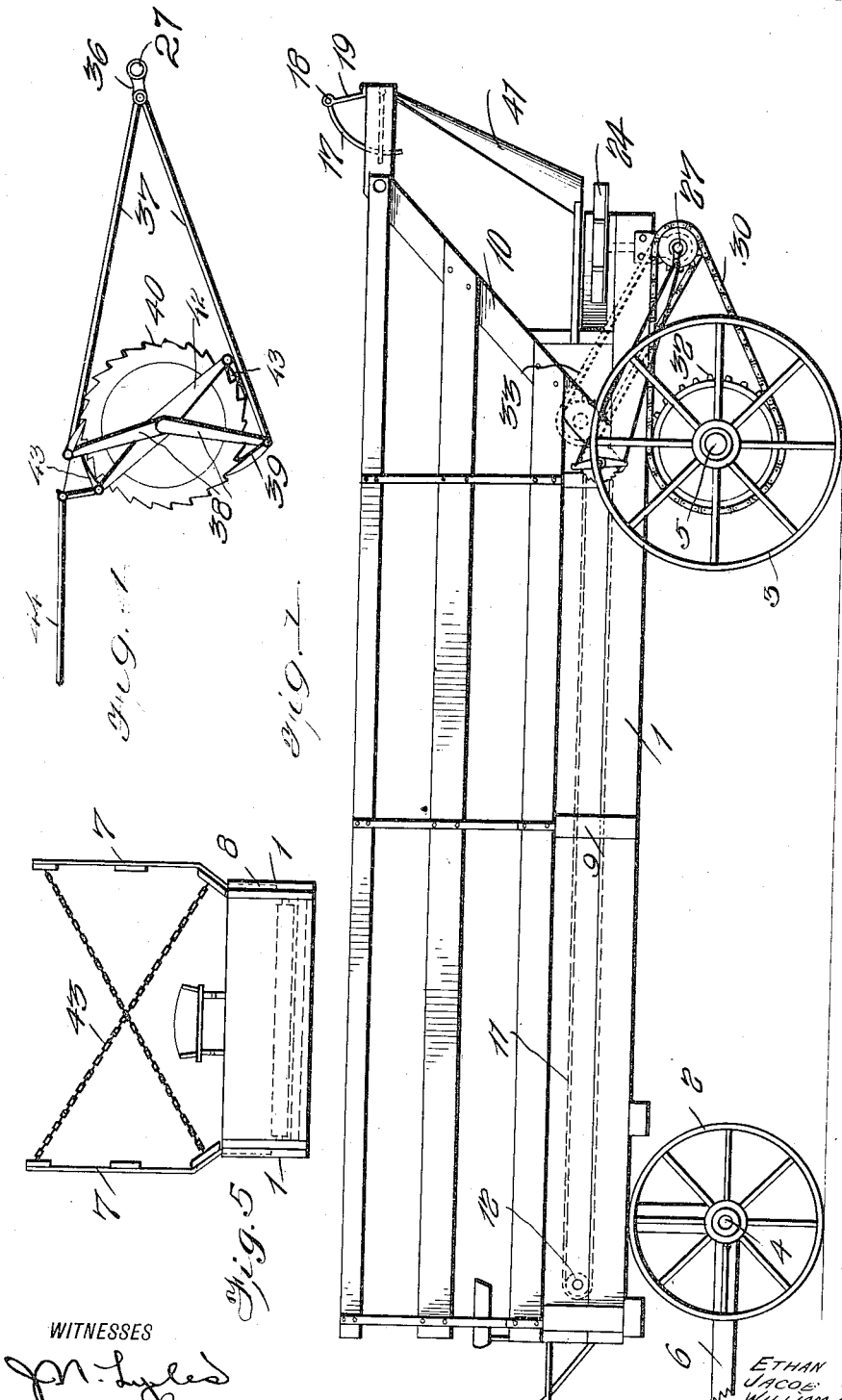

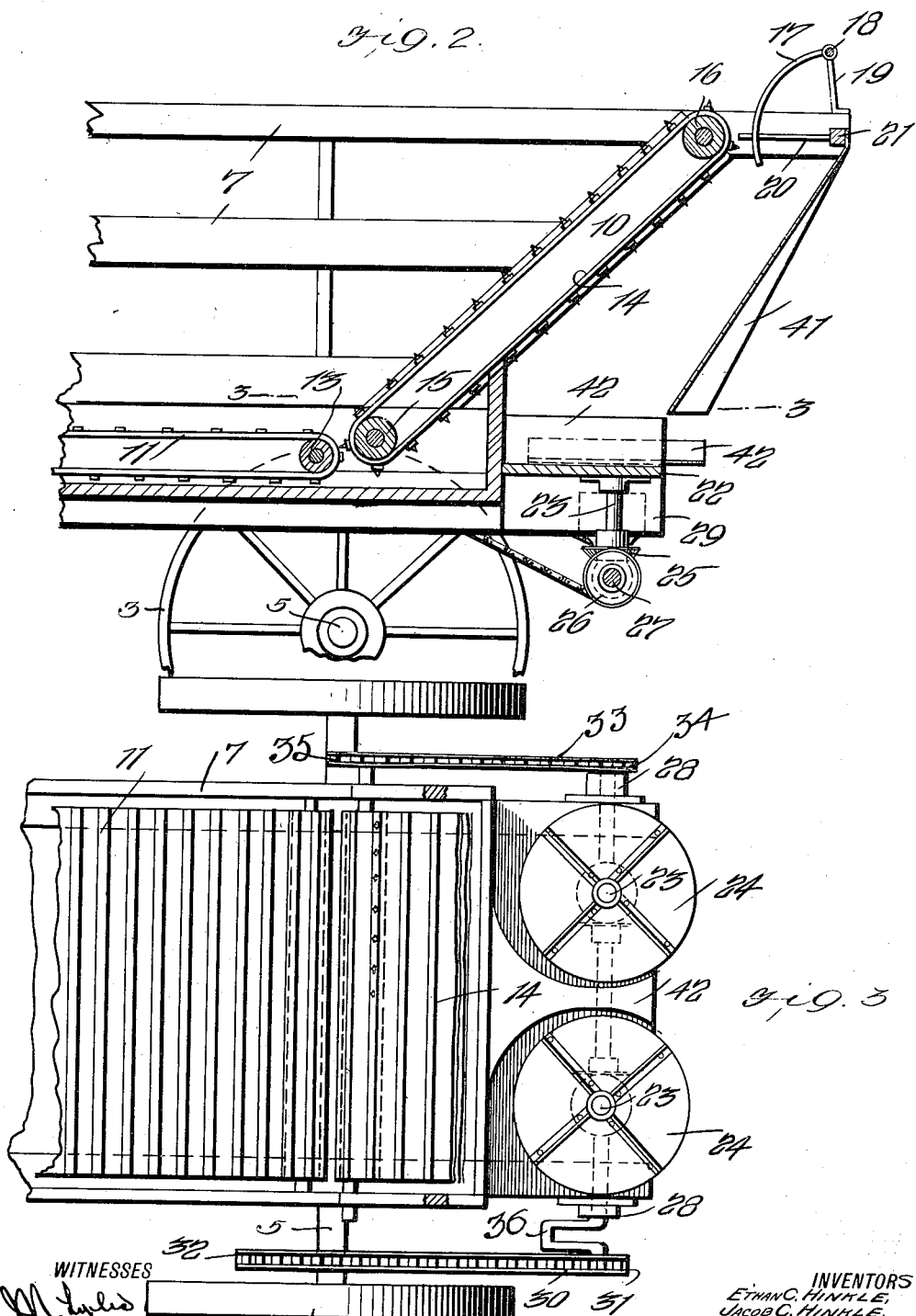

ETHAN C. HINKLE, JACOB C. HINKLE, AND WILLIAM A. HINKLE, OF LORETTO, NEBRASKA.

SPREADER.

1,259,739.     Specification of Letters Patent.     Patented Mar. 19, 1918.

Application filed July 24, 1917. Serial No. 182,389.

*To all whom it may concern:*

Be it known that we, ETHAN C. HINKLE, JACOB C. HINKLE, and WILLIAM A. HINKLE, citizens of the United States, and residents of Loretto, in the county of Boone and State of Nebraska, have invented new and useful Improvements in Spreaders, of which the following is a specification.

Our invention is an improvement in spreaders, and has for its object to provide mechanism of the character specified for spreading straw, fertilizer and the like, wherein a vehicle is provided having means for moving the material longitudinally of the body to distributing mechanism arranged at the rear of the body for distributing the material over a wide area as the vehicle is moved.

In the drawings:

Figure 1 is a side view of the improved spreader;

Fig. 2 is a longitudinal vertical section;

Fig. 3 is a section on the line 3—3 of Fig. 2, looking in the direction of the arrows adjacent the line;

Fig. 4 is an end view of the bed, looking from the front;

Fig. 5 is a front view of the body.

In the present embodiment of the invention, a vehicle is provided comprising a box body 1, supported by front and rear wheels 2 and 3, the said wheels being mounted on axles 4 and 5, respectively, and the axle 5 has a tongue 6 connected therewith and is mounted to turn with respect to the body to guide the vehicle.

Detachable sides 7 are connected with the box body, the said sides having depending bars 8 which engage sockets 9 on the body, to hold the sides in place. It will be noticed from an inspection of Fig. 1 that each of the sides inclines inwardly toward its bottom at the rear, and the plates 10 which form the rear of the sides act also as a supporting frame for an endless conveyer to be described. Another endless conveyer is arranged in the box body near the bottom, the said conveyer comprising an endless apron 11 which is supported by rollers 12 and 13 at the front and rear of the body, respectively, the shafts of the rollers being journaled in the sides of the body.

The endless apron has transverse slats, as shown, and the upper run is adapted to carry the material to be spread toward the inclined or distributing conveyer. Said conveyer comprises an endless belt 14 having transverse slats, as shown, and mounted on rollers 15 and 16 which are journaled in the plates 10 before mentioned, at the bottom and top thereof.

The upper run of the apron 11 delivers to the upper run of the apron 14, and the said apron 14 delivers to a series of spring-hinge retarding fingers 17. These fingers are curved, as shown, and are arranged with their convex surfaces toward the delivery end of the apron 14, and these fingers are secured to a rod 18 which is held in brackets 19 on extensions from the upper sides of the sides 7. Other retarding fingers 20 extend forwardly from a bar 21 which is secured between said extensions, and these fingers 20 alternate with the fingers 17. The fingers 20 are straight. The free ends of these fingers 17 and 20 are at the point where the material passes from the conveyer 14, and the said material must fall through these fingers.

A shelf or platform 22 is arranged in rear of the box body and slightly above the bottom thereof, and vertical shafts 23 are journaled in this shelf or platform. Fans are secured to the shafts above the platform, each fan 24 comprising a disk having radial vanes, as shown, and the said vanes, when the material falls thereon, will throw the said material laterally and rearwardly, distributing the same uniformly over a wide area, the width of the area depending upon the speed and size of the fan.

The shafts 23 have bevel gears 25 on their lower ends, which mesh with similar gears 26 on a shaft 27 journaled in bearings 28 on depending cheek pieces 29 at the ends of the shelf or platform. This shaft 27 is driven by a sprocket chain 30, which connects a sprocket wheel 31 on the said shaft with the sprocket wheel 32 on the rear axle. The roller 15 of the endless conveyer 14 is driven from the shaft 27 through a sprocket chain 33 which connects the wheel 34 on the shaft with a similar wheel 25 on the roller 15. The conveyer 11 is driven from the shaft 27. The shaft has a radial arm or crank 36, and this crank is connected by links 37 with a pair of pawl carriers 38 journaled on the shaft of the roller 13. Each of these pawl carriers carries a pawl 39, and the said pawls coöperate with the ratchet wheel 40 on the roller shaft. It will be obvious that when the shaft of the roller 15 is rotated the shaft of the roller 13 will be driven, the relative speed depending upon the size of the ratchet wheel.

The material falling through the fingers 17 and 20 is guided toward the distributing fans by guide plates 41 which are connected to the bar 21, and extend inwardly and downwardly toward the fans. It will be noticed that these guides or shields are curved transversely, and are arranged with their concave faces forwardly, and they are arranged to deliver on to the faces of the fans. A partition 42 is arranged between the fans, the said partition extending rearwardly from the rear end of the box body between the distributing fans, and it will be noticed that the said partition has concaved faces at the fans.

It will be noticed that each of the slats of the conveyer 14 has a longitudinally extending series of teeth for insuring the upward movement of the material to be distributed. The detachable sides 7 are supported against the outward pressure of the material by means of cross chains 43, the said chains being connected at one end to the top of one side and at the other to the bottom of the other side.

In the operation, the material to be spread is loaded in the box body on the endless conveyer 11. The vehicle is driven through the field, and the movement of the vehicle drives the distributing fans and the endless conveyer 14, which in turn drives the conveyer 11, gradually moving the material back to the conveyer 14, which elevates the same, delivering it through the fingers 17 and 20 on to the distributing fan.

The stroke of the pawls 39 may be regulated by means of the mechanism shown in Fig. 4, wherein a cross head 42 is pivoted on the shaft of the roller 13, and the said cross head has at each end a plate 43, the plate 43 overlying the tooth of the ratchet wheel. The position of the cross head is regulated by a link 44 which may be connected with suitable operating mechanism, and by moving the cross head the pawls 39 may be engaged with one, two or more teeth, as may be desired, depending upon the length of the stroke of the pawl. If it is intended that the pawls engage but a single tooth, the plates 43 are moved until, on the backward motion of the pawls, they will over-ride the plates 43 after passing one tooth, so that the pawl can engage but a single tooth. The mechanism is similar to the line-space regulating mechanism of a typewriter.

I claim:

1. A spreader of the character specified comprising a box body, front and rear wheels supporting the body, an endless conveyer movable longitudinally of the body, an upwardly inclined endless conveyer at the rear of the body, horizontally arranged distributing fans below the delivery end of the last named carrier and to which the said carrier delivers, a driving connection between the wheels, the fans and the last named conveyer, a driving connection between the last named conveyer and the first named conveyer, a plurality of series of separating fingers between the fans and the inclined conveyer through which the material passes to the fans, the fingers of one series being fixed, the fingers of the other series being yielding and hinged and alternating with the fingers of the first named series, means for guiding the material to the fans from the fingers, and detachable sides for the body.

2. A spreader of the character specified comprising a box body, front and rear wheels supporting the body, an endless conveyer movable longitudinally of the body, an upwardly inclined endless conveyer at the rear of the body, horizontally arranged distributing fans below the delivery end of the last named carrier and to which the said carrier delivers, a driving connection between the wheels, the fan and the last named conveyer, a driving connection between the last named conveyer and the first named conveyer, a plurality of series of separating fingers between the fans and the inclined conveyer through which the material passes to the fans, the fingers of one series being fixed, the fingers of the other series being yielding and hinged and alternating with the fingers of the first named series.

3. A spreader of the character specified comprising a box body, front and rear wheels supporting the body, an endless conveyer movable longitudinally of the body, an upwardly inclined endless conveyer at the rear of the body, horizontally arranged distributing fans below the delivery end of the last named carrier and to which the said carrier delivers, a driving connection between the wheels, the fan and the last named conveyer, a driving connection between the last named conveyer and the first named conveyer, and a plurality of series of separating fingers between the fans and the inclined conveyer through which the material passes to the fans.

ETHAN C. HINKLE.
JACOB C. HINKLE.
WILLIAM A. HINKLE.